United States Patent [19]

Rees et al.

[11] Patent Number: 5,570,978
[45] Date of Patent: Nov. 5, 1996

[54] HIGH PERFORMANCE CUTTING TOOLS

[76] Inventors: John X. Rees, 24813 Ave. 212, Lindsay, Calif. 93247; Edward M. Sybesma, 1031 Greenfield Dr., Porterville, Calif. 93257

[21] Appl. No.: 349,329

[22] Filed: Dec. 5, 1994

[51] Int. Cl.⁶ .................................................. B23B 51/10
[52] U.S. Cl. ........................ 408/144; 408/224; 408/229
[58] Field of Search ................................. 408/224, 225, 408/144, 229, 231–233, 713

[56] References Cited

U.S. PATENT DOCUMENTS

| | | | |
|---|---|---|---|
| 1,017,352 | 2/1912 | Wagner | 408/224 |
| 1,047,466 | 12/1912 | Wagner | 408/224 |
| 2,817,983 | 12/1957 | Mossberg | 408/144 |
| 3,333,489 | 8/1967 | Mossberg | 408/233 |
| 4,093,395 | 6/1978 | Luebbert et al. | 408/224 |
| 4,160,616 | 7/1979 | Winblad | 408/144 |
| 4,480,951 | 11/1984 | Regensburger | 408/224 |
| 4,605,347 | 8/1986 | Jodock et al. | 408/224 |
| 4,620,822 | 11/1986 | Haque et al. | 408/224 |

Primary Examiner—Steven C. Bishop
Attorney, Agent, or Firm—Dennis B. Haase

[57] ABSTRACT

A high performance cutting tool for drilling complex holes in a work piece comprising a body having a shank for rotating the tool with a drilling machine, an intermediate flute portion having a plurality of straight flutes formed thereon, and a forward, nose portion. A unitary insert having a plurality of cutting edges formed thereon is received in a slot formed in the cutter tool so as to be driven thereby in a manner which permits cutting of a complex hole in a work piece when the cutting tool is rotated in the work piece.

5 Claims, 1 Drawing Sheet

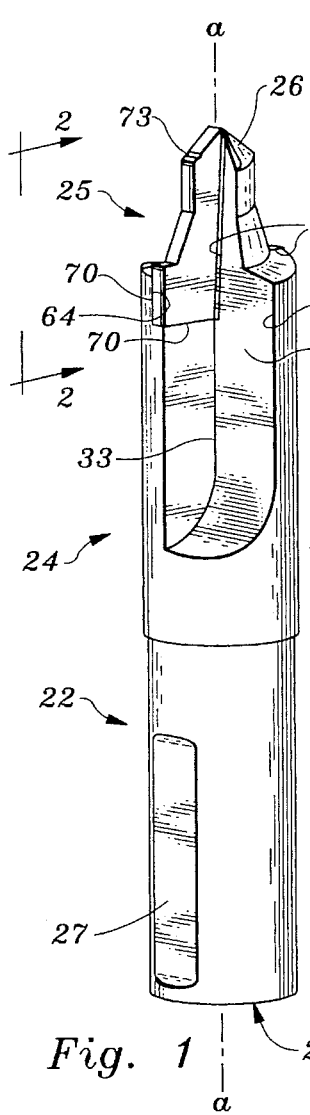
Fig. 1
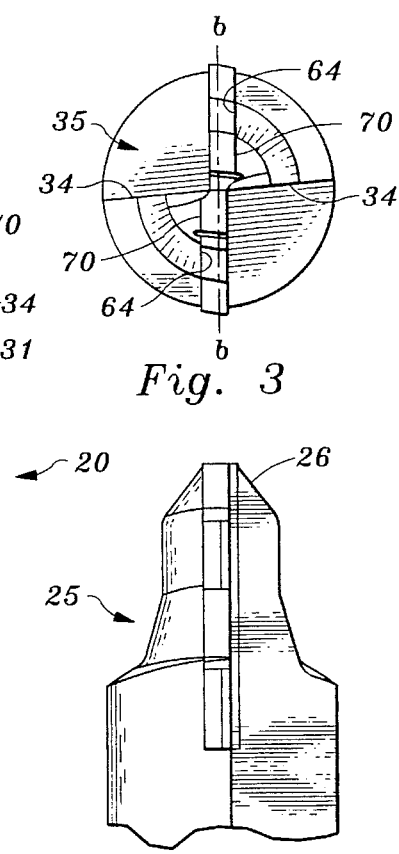
Fig. 3
Fig. 2
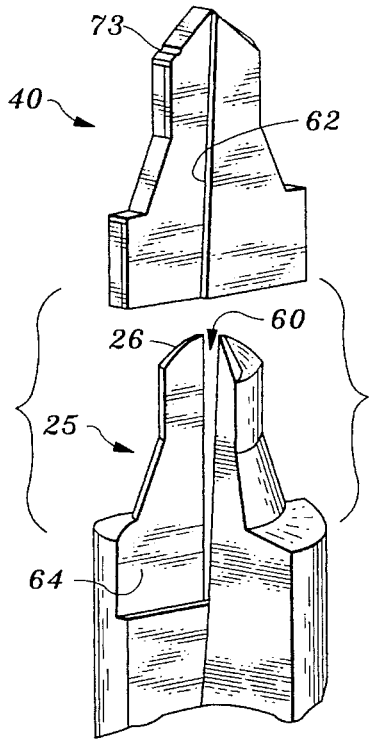
Fig. 4
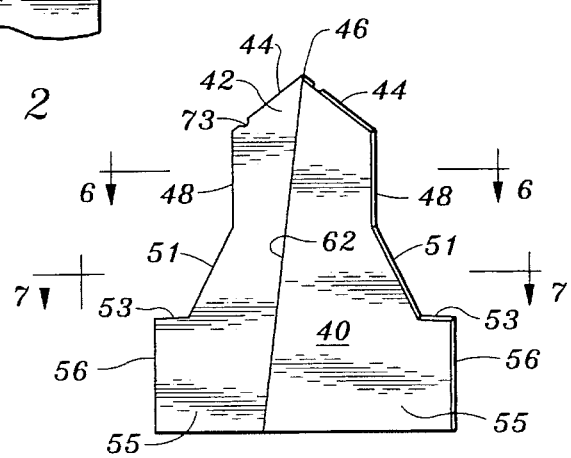
Fig. 5
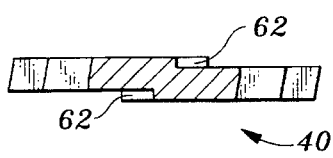
Fig. 6
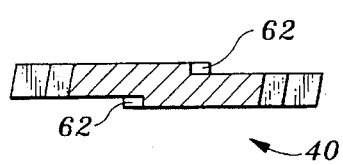
Fig. 7
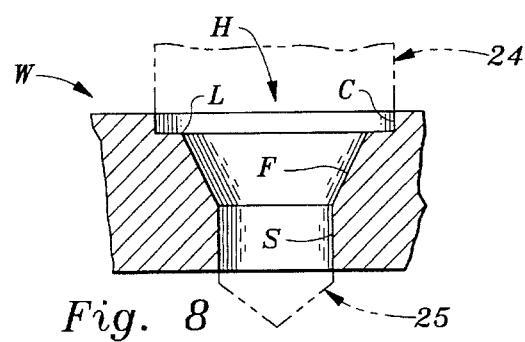
Fig. 8

HIGH PERFORMANCE CUTTING TOOLS

The present invention relates generally to cutting tools for machining multi-faceted holes in metal work pieces and, more particularly, to such cutting tools in which carbide cutting elements are secured in a drill shank, and/or its fluted areas, to provide and create, upon rotation of the drill, a hole of predetermined size and configuration.

BACKGROUND OF THE INVENTION

1. Field of the Invention

Drills, as a metal or wood working tool, have existed for several years. Such tools typically consist of a shank portion, which may be straight or tapered, and a flute portion terminating in a tip which initially penetrates into the metal work piece to position the cutting tool on the work piece. Flutes may be helical or straight. In either case, however, the flutes extend radially outwardly from the longitudinal axis of the tool and terminate in a peripheral edge which may be sharpened, so as to present a cutting surface to the work piece, be it metal, or wood, or some other composition.

As in any labor intensive manufacturing process, time is of great importance. As the quest for greater efficiency and productivity became the focus of every manufacturer, those whose products required one or more holes to be formed in a work piece sought tools that could do the job faster without sacrifice to quality.

This quest translated, for such manufacturers, into a need for high performance cutting tools in the form of drills. However, speed was only one factor, and the tool had to be not only fast, but had to last through a large number of cycles. Speed, however, begat heat and a greatly increased amount of metal chips at the site of the cut. Heat is destructive of the tool and the process and it was necessary, therefore, to not only cool the cutting surfaces, but to rapidly remove metal chips from the immediate area of the cut.

These needs, early on, seemed to be met by the advent of carbide cutting elements, which, by virtue of their hardness and strength, seemed to remain sharp and relatively impervious to heat for a considerable number of cycles, irrespective of the characteristics of the work piece to be machined.

Furthermore, as long as the machine function was one of drilling a hole of constant diameter, the process of creating a cutting tool, in the form of a twist drill, is relatively easy. When, however, the hole to be cut includes a countersink, multiple diameters, and perhaps one or more lands, the tool becomes complex. Obviously, in order to devise one tool to drill a complex hole, several cutting surfaces would have to be formed along the flute, and at specific angles with one another, to define the precise hole needed.

To this end, makers of tools such as drills were required to form a variety of angularly disposed cutting surfaces on their drills and where a carbide cutting tool was called for, the process became more difficult, in particular because of the difficulty in working with carbide materials which are notoriously tough.

2. Description of Related Prior Art

The cutting tool industry's response to the needs of manufacturers who use their cutting tools, at least to date, has been to either sharpen the flutes on the tool itself, or, where harder cutters are called for, to form a series of carbide elements, typically in opposed pairs, and secure them, in diametric opposition, on the drill.

Exemplification of this latter principal is found in the carbide drills currently made by ARC Cutting Tools, Inc. in which carbide cutting elements having a cutting surface disposed at a specific angle relative to the longitudinal axis of the body of the drill, are affixed to the flutes of a drill, at various positions along the axis of the drill. When the drill is rotated into a work piece, the various surfaces bore out a hole of predetermined configuration in accordance with the manufacturers specification.

There are also several patents which reflect the industry's slavish adherence to these time honored formulae, among them Haque et al. U.S. Pat. No. 4,620,822, and Jodock et al. U.S. Pat. No. 4,605,347, both of which illustrate sharpened flute edges.

Regensburger U.S. Pat. No. 4,480,951, discloses a self tapping screw in which the base portion of a drill bit is secured in the leading edge of the screw and opposed wings are separately attached to the sides of the drill bit. While not itself a cutting tool, but rather a one-time use fastener, Regensburger illustrates the kind of thinking which permeates the industry generally. Several variations on the same theme are shown in FIGS. 6 through 12 of his patent.

Luebbert U.S. Pat. No. 4,093,395 illustrates a twist drill for use with composite materials and includes a carbide tip 11 brazed onto a tool steel body. The tool illustrated lacks the kind of strength necessary to accomplish the tasks capable of being performed by the tool of the present invention for the many reasons discussed in the following Description of a Preferred Embodiment.

Unfortunately, simply hanging a series of cutting elements on the perimeter of a drill, as in the nature of Regensburger, is fraught with problems, such as breaking off of one or more of the elements, irregular and excessive wear of the cutting surfaces, and mispositioning of the elements, and inadequate heat dissipation, all of which can, and do, result in a poor quality, out of tolerance hole in a work piece that may well be ruined as a result.

SUMMARY OF THE INVENTION

The focus of the present invention is to provide a highly accurate carbide cutting tool that will obviate the inadequacies of the prior an and provide the industry with a reliable high performance cutting tool that will repeatedly cut an accurate, in tolerance, hole in a work piece.

More specifically, it is an objective of the present invention to provide a unitary carbide cutting element, formed with a plurality of angularly disposed cutting surfaces, which may be mounted in the body of a drill to provide a cutting tool for cutting a hole in a work piece in a predetermined configuration.

Another object of the present invention is to provide a cutting tool with a single carbide cutting element capable of cutting a complex hole in a work piece.

A further objective of the present invention is to provide a high performance cutting tool capable of great efficiency in both dissipating heat from the cutting area, and removal of cuttings in the form of metal chips from that cutting area.

The foregoing, as well as several other objects and advantages, will become apparent to one skilled in the art as the following detailed description of a preferred embodiment is studied, in conjunction with the drawings, wherein:

DESCRIPTION OF THE DRAWINGS

FIG. 1 is an elevation view of a high performance cutting tool constructed and assembled in accordance with the present invention;

FIG. 2 is an enlarged partial view of the working end of the cutting tool of FIG. 1, providing greater detail of the interaction of the carbide cutting element and the flute portion of the tool of the present invention;

FIG. 3 is a top plan view of the cutting tool of the present invention as illustrated in FIG. 2;

FIG. 4 is an exploded view of FIG. 2, illustrating how the carbide cutting element fits with the cutting tool of the present invention;

FIG. 5 is a side view of the unitary carbide cutting element of the present invention;

FIG. 6 is a sectional view of the carbide cutting element of FIG. 5, taken along section lines 6—6 thereof:

FIG. 7 is a sectional view of the carbide cutting element of FIG. 5, taken along section lines 7—7 thereof;

FIG. 8 is a cut away of a portion of a work piece, sectioned to illustrate a complex hole formed by the tool of the present invention.

DESCRIPTION OF A PREFERRED EMBODIMENT

With reference now to the drawings, and in particular FIG. 1, a high performance cutting tool, in the form of a straight 2-fluted drill, is shown at 20, and is constructed in accordance with the present invention.

The drill 20 comprises, generally, an elongated cylindrical body 21 formed around, and having a shank portion 22, an intermediate flute portion 24, and a nose portion 25 terminating in a relatively pointed, axially disposed, tip portion 26.

In the tool illustrated, the shank portion is straight, meaning that it is uniformly cylindrical, although it may also be tapered without departure from the invention, since both configurations are in common use in the industry.

A flat area is provided at 27 which is illustrative of any one of several methods by which the shank may be received and retained in a chuck (not shown in the drawings) of a power drill, boring machine or other drilling machine tool. Thus, the flat may represent a keyway, a flat for a set screw, or simply a flat surface that will prevent the cutting tool from turning in the chuck, or other holding device, while in use.

The flutes 24, as illustrated, comprise a pair of generally straight, longitudinally extending, formations 31 expanding radially outwardly, in an arcuate path from a root area 33, to a relatively straight edge 34, and defining, between them, a pair of relatively deep, straight grooves .55, through which lubricant, which also serves as a coolant, may be injected to the cutting edges or surfaces and material cut from the work piece W, in the form of chips or shavings is carried away from the cut area.

The present invention was developed primarily to solve problems encountered in forming complex, stud receiving, holes in aluminum wheels and, therefore, has particular, although not exclusive, utility in cutting holes in aluminum wheels to accommodate lugs, and lug nuts. Such holes are deemed complex in that they are to cut a hole having a number of angularly distinct surfaces, and the hole is to be cut in a single pass.

Perhaps the best way to understand the present invention is to discuss it in terms of one complex drilling operation that might be performed with this novel cutting tool.

With reference to FIG. 8, and by way of illustration, but not limitation, one such complex hole H is illustrated as initially requiring a relatively small diameter hole S which accommodates a wheel stud; a chamfered area of frustro-conical shape F extends outwardly from the aforesaid hole S; a flat area L formed at the upper extremity of the frustro-conical section F, sometimes referred to as a land, to permit seating of the lug nut once on the stud, and a relatively larger diameter bore to accommodate the lug nut itself in a manner that permits the lug nut to be torqued onto the stud, and, of course, removed, both operations being performed with a conventional lug wrench.

All of these facets must be accurately drilled and formed in one drilling motion, quickly and with great accuracy. Indeed, the failure of any aspect of the process will, in all likelihood, result in the destruction of the work piece casting, and a consequent great expense to the manufacturer.

In accomplishing this aspect of the invention, there is provided, in accordance with the invention, a unitary carbide cutter element, or more specifically, insert 40, which is illustrated in some detail in FIGS. 4, and 5 through 8. The insert is essentially symmetric in profile, about a central longitudinal axis b—b, and includes a tip section 42 terminating in an axially disposed point or tip 46, from which chisel, or cutting edges or surfaces 44, extend outwardly and rearwardly, as seen in FIG. 5, at an acute angle from central terminus or tip 46, which as previously discussed, is disposed at the forward most point on the longitudinal axis of the insert 40.

Depending from the surfaces 44, again as seen in FIG. 5, there are parallel cutting edges or surfaces 48, themselves coplaner with the longitudinal axis b—b of the insert 40. The cutting surfaces 48 cut, dress and hone the hole for the wheel stud.

Thereafter, there is provided opposed flared surfaces 51, which extend outwardly from the center of the insert 40 as they move downwardly, as depicted in FIG. 5. The surfaces 51 are sharpened and serve to cut away material as the drill is advanced into the work piece, to provide a frustro-conical shaped area above that portion of the hole that represents the hole for receipt of the stud.

At the end of the skirts 51 there are radially outwardly extending cutting edges 53. The edges 53 serve to counterbore the stud hole above the frustro-conical section. This counterbore serves to receive the lug nut with sufficient clearance to permit the use of a lug wrench to torque down, and/or remove the lug nut.

Finally, driver wings 55 are formed at, and as, the base of the insert 40. The wings 55 serve as reaction members against which rotary forces generated on the drill are transmitted to the insert. Additionally, the edges 56 are sharpened, and when the tool is rotated, establish the diameter of the counterbore.

As will be apparent from the foregoing description, all of the various cutting surfaces comprise diametrically opposed pairs of such cutting edges, so that as the cutter tool is rotated, there are always two cutting edges working on the same area of the work piece at all times.

With reference primarily to FIG. 4, the insert 40, which may be, but is not by necessity, made of a carbide, is, with the exception of the cutting edges, completely housed in the forward, or nose section or portion 25, with the wing portions extending a short distance into the fluted area 24 of the cutting tool 20. The chisel portion protrudes beyond the tip of the flutes, so as to make the initial contact with the work piece.

It will be noted that the cross section, or profile of the nose portion 25 and the side elevation of the insert 40, above the wings 55, which is housed in the nose portion of the tool are virtually identical, differing dimensionally so as to expose all of the cutting surfaces to the work piece. Thus, when the insert is positioned and secured in the tool, the cutting surfaces of the insert are exposed to the work piece.

In order to accommodate the insert 40 within the tool 20, a slot 60 is formed in the forward portion of the flute area. The slot 60 is cut on a plane which is coincident with the axis b—b of the unitary cutter insert 40 which dissects the flutes, and intersects, at right angles, the longitudinal axis a—a of the tool 20, as best illustrated in FIG. 3.

The insert 40 is formed with a pair of opposed lands 62, which align with the driving surfaces 64 of the cutter tool. The driving surfaces are created upon cutting of the slot 60, and comprise the side walls of the slot which engage the sides of the cutter insert upon assembly of the insert into the tool. Such construction results in a smooth transition within the groove 33 between the wall 64 of the flute portion of the tool, and the insert 40, thereby alleviating any disruption of the flow of fluid lubricant, or the coincident dispatch of waste material in the form of chips or shavings removed from the work piece. By the use of straight, rather than helical flutes, the tool is very efficient in permitting coolant to access the cutting surfaces, and temperatures are, therefore, kept within an acceptable working range during the drilling operation.

Moreover, by combining the novel unitary carbide insert with a pair of radially opposed straight flutes, a further benefit is achieved in the area of chip removal. Specifically, a highly favorable ratio is defined between the feed rate of the tool and the thickness of the chip developed at the cutting surfaces, namely, the thickness of the chip will be one half the feed rate. Thus, with a feed rate of 0.020 inches per revolution, a chip of 0.010" is formed.

In order to secure the insert 40 in position within the tool 20 to perform the tasks for which the tool was designed, a number of brazing or soldering processes may be employed. However, due to diverse co-efficients of expansion between the steel tool and the carbide insert, it has been found that the use of a tri-ply silver solder is uniquely suited to the task. Thus a tri-ply silver solder bead 70 is drawn between the insert and the surfaces in contact with the cutting tool to secure the former in the slot 60 formed in the latter. It will be appreciated that, with the burgeoning popularity of ceramics, and in other cases where the materials employed are other than the mating of heat treated steel and carbides, that other bonding materials may be used and, indeed, may be superior. However, neither the use of materials other than steel mated with carbides, nor the use of other bonding materials, will constitute a departure from the underlying invention as herein described.

Finally, the invention contemplates the provision of means for breaking up shavings or chips to prevent clogging up the cutting areas. To this end, there is provided at least one notch 73 on the lead cutting surface 44, which notch has the salutary effect of breaking up chips formed at the cutting surface in order that they may be carried away from the situs of the cut. Other chip breakers may be strategically placed along any one or all of the several cutting surfaces, where appropriate, all without departure from the invention.

Having thus provided a detailed description of a preferred embodiment of the invention, what is claimed is:

1. In a relatively large high performance cutting tool for forming complex holes in work piece such as an aluminum wheel, or the like;

said tool having an elongated generally cylindrical body symmetrically formed about a longitudinal axis, said elongated body having a shank portion, an intermediate flute portion and a nose portion terminating in a tip, all said portions being formed about a longitudinal axis;

said flute portion defining a pair of diametrically opposed straight sided flutes, said flutes together defining a pair of diametrically opposed deep groves;

said nose portion and said flat portion together defining a slot, said slot extending inwardly from said tip of said nose portion along the longitudinal axis to a predetermined depth;

means defining an elongated unitary cutter insert, said cutter insert being formed of a relatively flat carbide material, and having a plurality of cutting edges formed thereon, said cutting edges being angularly disposed with respect to one another;

said insert being secured by brazing the same with tri-ply solder in said slot such that as said tool is rotated about its longitudinal axis, said cutting edges contact the work piece to form a complex hole therein.

2. The tool as set forth in claim 1, wherein said cutting edges extend radially outwardly beyond the circumference of said flute and nose portions.

3. The tool as set forth in claim 1, wherein said flutes are straight sided.

4. The tool as set forth in claim 1, wherein said flute portions together define a pair of opposed grooves through which liquids may be transferred to said cutting edges and material cut from a work piece may be carried away.

5. The tool as set forth in claim 1, wherein said cutter element is formed with a notch in at least one cutting edge to define a chip breaker.

\* \* \* \* \*